United States Patent [19]

Shiokawa

[11] Patent Number: 5,604,724
[45] Date of Patent: Feb. 18, 1997

[54] MAXIMUM LIKELIHOOD ESTIMATION USING REFERENCE AND SPONTANEOUS OUTPUT PEAKS OF PARTIAL RESPONSE EQUALIZER

[75] Inventor: Masato Shiokawa, Tokyo, Japan

[73] Assignee: NEC Corporation, Tokyo, Japan

[21] Appl. No.: 534,210

[22] Filed: Sep. 26, 1995

[30] Foreign Application Priority Data

Sep. 26, 1994 [JP] Japan .................................. 6-229254
Feb. 27, 1995 [JP] Japan .................................. 7-063428

[51] Int. Cl.$^6$ .............................. G11B 7/00; H03H 7/30
[52] U.S. Cl. ........................ 369/124; 375/324; 375/233; 375/265; 375/339; 340/855.3; 358/406
[58] Field of Search ....................... 369/124, 107, 369/94; 375/324, 233, 340, 265, 339; 340/855.3; 358/406

[56] References Cited

U.S. PATENT DOCUMENTS

| | | |
|---|---|---|
| 3,723,649 | 3/1973 | Pitegoff et al. .......................... 358/406 |
| 5,010,333 | 4/1991 | Gardner et al. ....................... 340/855.3 |
| 5,132,988 | 7/1992 | Fisher et al. ............................ 375/233 |
| 5,321,725 | 6/1994 | Paik et al. ............................... 375/265 |
| 5,432,818 | 7/1995 | Lou ........................................ 375/324 |

*Primary Examiner*—Loha Ben
*Attorney, Agent, or Firm*—Sughrue, Mion, Zinn, Macpeak & Seas

[57] ABSTRACT

In a signal processor for processing a multilevel signal, a partial response equalizer is provided having a first predetermined number of reference amplitudes. The equalizer receives the multilevel signal and detects a significant instant of amplitude transition of the multilevel signal with respect to the reference amplitudes and produces a signal representative of the amplitude at the detected significant instant. The amplitude representative signal assumes one of a second predetermined number of amplitudes including spontaneously generated amplitudes, the second predetermined number being greater than the first predetermined number of the reference amplitudes. A maximum likelihood estimator, connected to the equalizer, have transition states and a state transition rule which determines one of the states with respect to decision thresholds greater in number than the first predetermined number and equal to or smaller than the second predetermined number. The estimator receives the amplitude representative signal from the equalizer and perform maximum likelihood estimation on the equalizer output according to the state transition rule.

8 Claims, 7 Drawing Sheets

FIVE LEVELS OF EQL OUTPUT

BRANCH METRIC CALCULATOR

FIVE LEVELS OF EQL OUTPUT

FIVE LEVELS OF EQL OUTPUT

FOUR LEVELS OF EQL OUTPUT
MINIMUM SPACING = 3

FOUR LEVELS OF EQL OUTPUT
MINIMUM SPACING = 4

BRANCH METRIC CALCULATOR

FOUR LEVELS OF EQL OUTPUT
MINIMUM SPACING = 2

MAXIMUM LIKELIHOOD ESTIMATION USING REFERENCE AND SPONTANEOUS OUTPUT PEAKS OF PARTIAL RESPONSE EQUALIZER

BACKGROUND OF THE INVENTION

1. Field of the Invention

The present invention relates generally to signal processing using partial response signaling and maximum likelihood estimation, and more specifically to processing of high-density playback signals such as those recorded on optical discs as a series of microscopic pin or those recorded on magnetic mediums using vertical recording techniques.

2. Description of the Related Art

In playback systems for optical or magnetic discs, equalizers are usually employed to compensate for intersymbol interference to improve the quality of high-density signals extracted from a recording disc. In the case of optical discs, microscopic pits produced by a laser beam are closely spaced apart. When a portion of the disc is irradiated continuously by the beam to form a long pit, the recording level is not necessarily uniform across the length of the pit due to unequal distribution of optical energies over the length of the pit, and the amplitude a signal extracted therefrom is not uniform. Since this nonuniformity has a nonlinear characteristic and cannot be compensated for by conventional transversal filter equalizers which are implemented with linear circuits and devices.

Another problem associated with the playback of high-density recorded signals is that; due to the mixed presence of long and short pits which are spaced at very short intervals, the playback signals from short pits have not sufficient energy to reach the saturation levels and their amplitudes vary in a range far short thereof, while the amplitude of those signals read from long pits varies in a range close to the saturation levels.

Partial response equalization is known for intersymbol interference problems. As typically represented by a PR(1,1) equalizer using three reference amplitudes −1, 0 and +1 as target values of equalization, the gain-versus-frequency characteristic of such equalizer produces an output having an emphasized gain at high frequencies. If a maximum likelihood estimation is used in combination with a PR(1,1) equalizer for reproducing high-density signals, the amplitude nonuniformity of readout signals and the characteristic high-frequency emphasis of the equalizer would produce a noise which seriously affects the estimation process.

Therefore, there is a need to improve the signal-to-noise ratio of a playback system for high density recorded signals.

SUMMARY OF THE INVENTION

It is therefore an object of the present invention to provide a signal processor of high signal-to-noise ratio for multilevel signals extracted from mediums such as optical discs and the like.

According to the present invention, there is provided a signal processor for processing a multilevel signal comprising a partial response equalizer having a first predetermined number of reference amplitudes, the equalizer receiving the multilevel signal and detecting therefrom a significant instant of amplitude transition with respect to the reference amplitudes and producing a signal representative of the amplitude at the detected significant instant, the amplitude representative signal assuming one of a second predetermined number of amplitudes including spontaneously generated amplitudes, the second predetermined number being greater than the first predetermined number of the reference amplitudes. A maximum likelihood estimator is provided having transition states and a state transition rule which determines one of the states with respect to decision thresholds greater in number than the first predetermined number and equal to or smaller than the second predetermined number, the estimator receiving the amplitude representative signal from the equalizer and estimating therefrom a maximum likelihood amplitude according to the state transition rule.

BRIEF DESCRIPTION OF THE DRAWINGS

The present invention will be described in further derail with reference to the accompanying drawings, in which.

DETAILED DESCRIPTION

Figure 1:
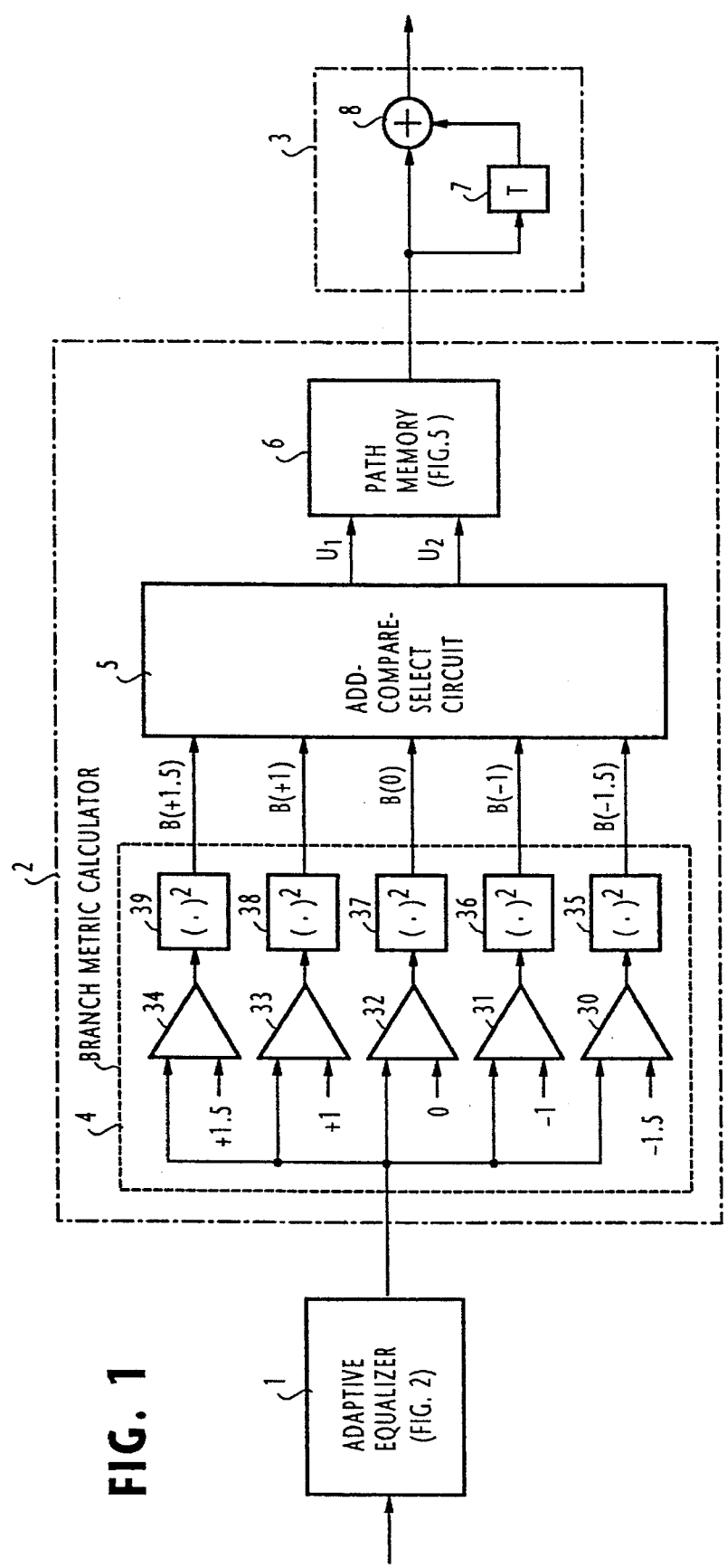
FIG. 1 is a block diagram of a signal processor for processing signals recorded on optical discs or vertically recorded on magnetic discs according to the present invention.

Referring now to FIG. 1, there is shown a signal processor of a playback system according to a first embodiment of the present invention for the reproduction of original signals stored in recording mediums such as optical disks or vertical axis magnetic recording mediums. The playback signal processor generally comprises an adaptive equalizer 1, a maximum likelihood estimator 2, and a (1+D) demodulator 3.

Figure 2:
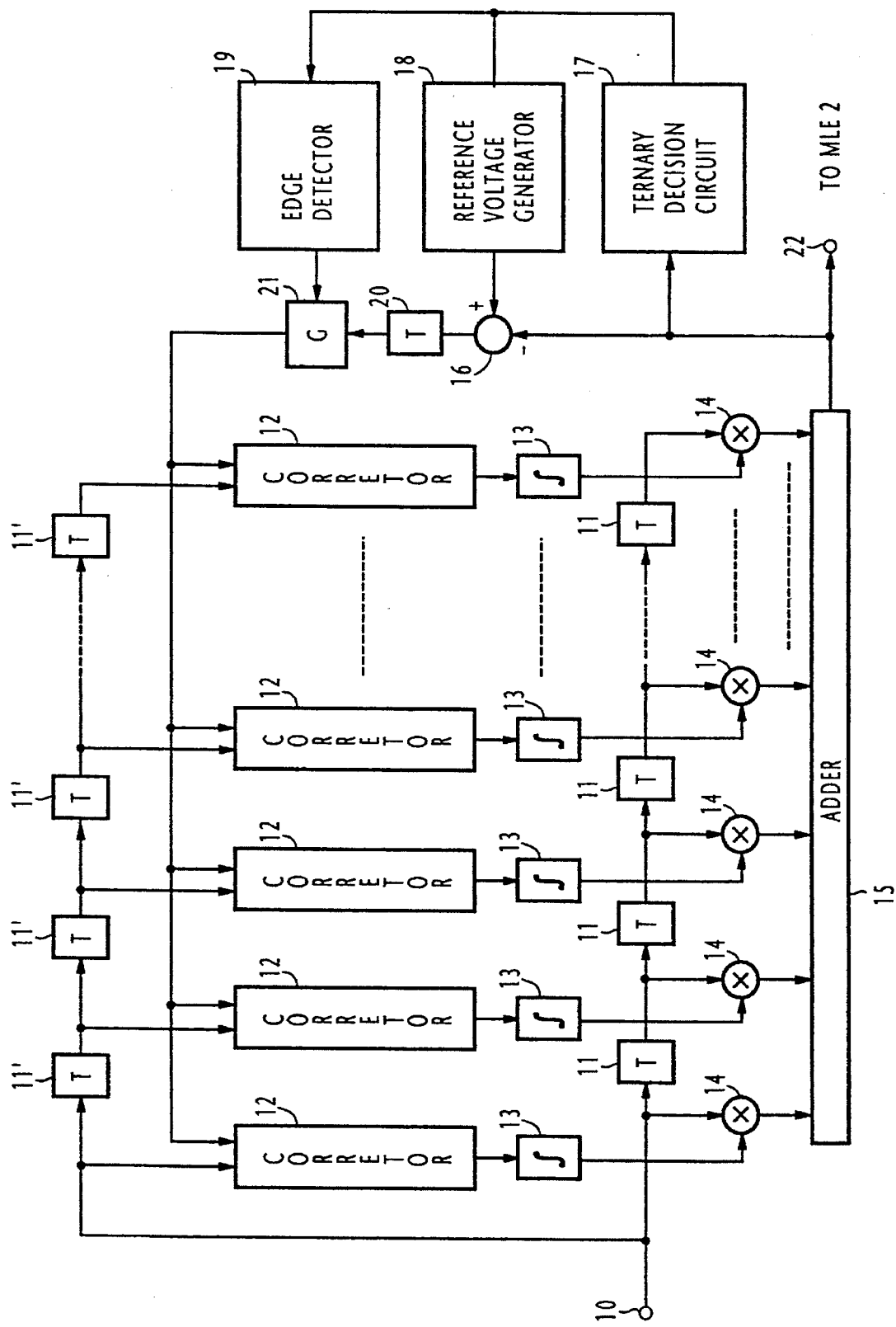
FIG. 2 is a block diagram of a partial response adaptive equalizer of the signal processor.

As shown in FIG. 2, the adaptive equalizer 1 includes a tapped-delay line filter formed by delay-line elements 11 connected in series to the input terminal 10 to receive the input signal to produce successive tap signals, a plurality of tap-weight multipliers 14 connected respectively to the taps for weighting the tap signals by respective tap weight coefficients $C_0, C_1, \ldots, C_N$ supplied from integrators 13 connected respectively to the outputs of correlators 12. The weighted tap signals are summed by an adder 15 and supplied to the output terminal 22. To the output terminal 22 are connected to a ternary decision circuit 17 and an error detector 16. A decision is made in the circuit 17 to determine to which one of reference values −1, 0 and +1 the output of the tapped-delay line filter is closest. The decision output is supplied to a reference voltage circuit 18 where the decision output is converted to the corresponding reference value and supplied to the error detector 16, where the difference between the tapped-delay line output is compared with the reference voltage to produce a decision error, which is delayed a unit interval in a delay element 20 and supplied to a gate 21. The decision output is further coupled to an edge detector 19 which drives the gate 21 to pass the component of the decision error to the correlators 12 that is generated at each edge of a recorded microscopic pit of the disc or each reversal of a signal vertically recorded on a magnetic recording medium. A second tapped-delay line is formed by delay-line taps 11' to receive the input signal and supplies replicas of the tap signals to the correlators 12, respectively. Correlations are taken by the correlators 12 between the replicated tap signals and the error signal. The tap-weight coefficients are adaptively controlled with the correlations so that the error power is reduced to a minimum.

By the adaptation control using the three reference amplitude levels −1, 0 and +1, the equalizer 1 produces output voltages that occur at different frequencies with peaks corresponding respectively to the reference amplitudes −1, 0 and +1. In addition to these reference peaks, the equalizer 1 spontaneously produces additional peak components that correspond to −1.5 and +1.5. If the frequency of amplitude occurrences is plotted as a function of the output of the equalizer, there appear three peaks centered respectively on reference amplitudes −1, 0 and +1, as well a two peaks centered respectively on amplitudes −1.5 and +1.5.

Thus, the equalizer 1 produces a total of five distinct amplitude peaks. However, these spontaneously produced peaks do not contribute to the detection of errors since they arise out of phase with significant instants of symbols, i.e., edges of a microscopic pit or reversals of vertically aligned magnetic flux. Therefore, decision errors generated as a result of the spontaneous amplitudes −1.5 and +1.5 are treated as invalid components and rejected by the gate 21.

Figure 3:
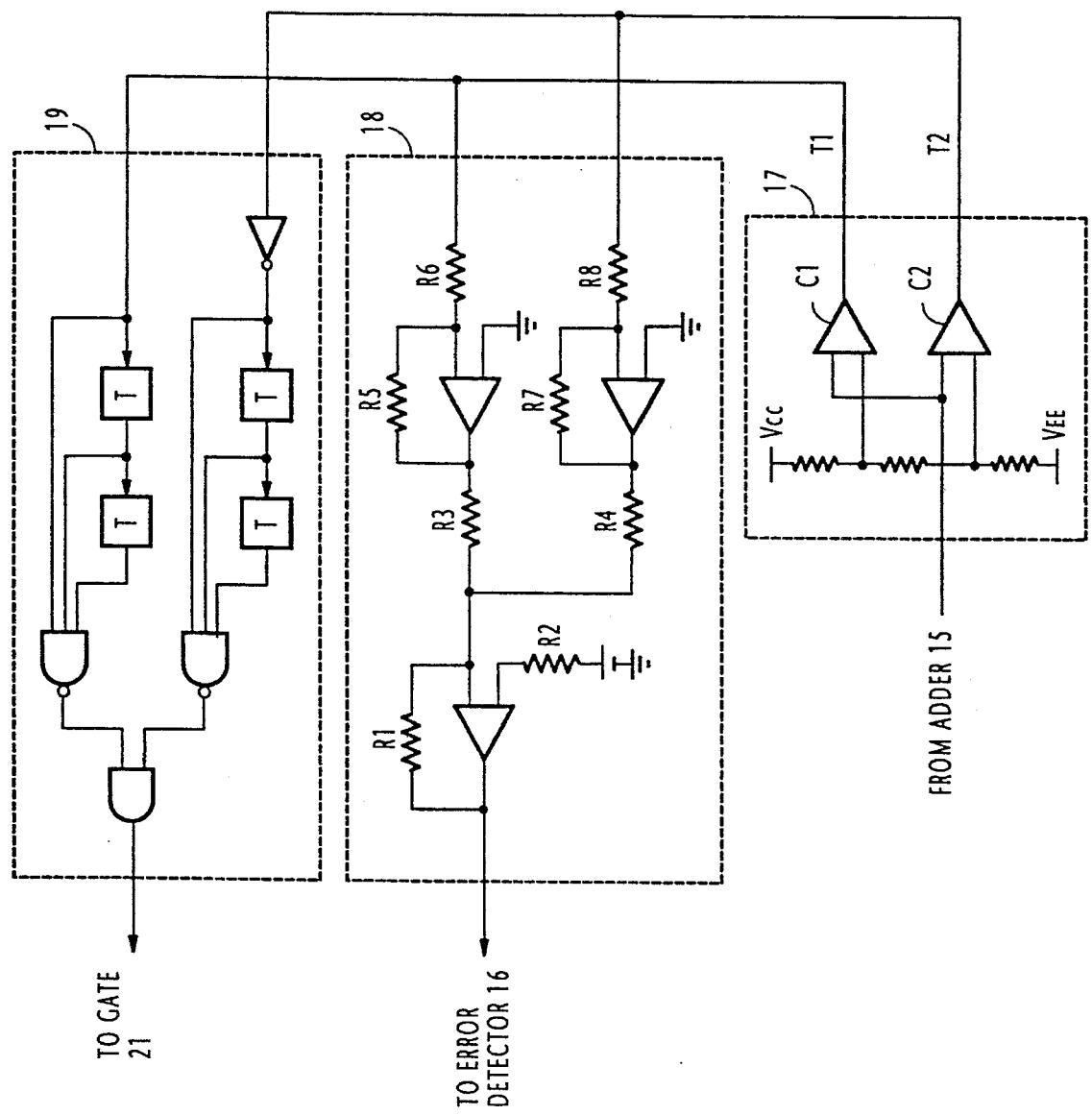
FIG. 3 shows details of the equalizer of FIG. 2.

More specifically, as shown in FIG. 3, the ternary decision circuit 17 includes a pair of comparators C1 and C2 for comparing the tapped-delay line output with two reference voltages set by resistances R9, R10, R11 between DC potentials and produces an output on leads T1, T2. The logic states of the leads T1, T2 determine a ternary decision. Reference Voltage generator 18 is responsive to the logic levels of the decision circuit 17 to produce an output voltage having three reference levels set by resistances R1 to R8. Edge detector 19 is also responsive to the logic levels of the output leads of decision circuit 17. If the output lead T1 is made repeatedly inactive (low) at least three times in succession or if the lead T2 is made repeatedly active (high) at least three times in succession, the gate 21 is turned off to prevent the invalid error components from being supplied to the correlators 12. The purpose of the delay unit 20 is to compensate for the time lag of the edge detector 19.

In an alternative embodiment, an equalizer of non-adaptive type can equally be used. Such equalizers comprise a tapped delay line, a plurality of tap-weight multipliers connected respectively to the successive taps of the delay line for weighting tap signals on the delay line, and an adder for summing the weighted tap signals. A tap-weight memory may be provided for storing the same tap weight coefficients as those obtained by the adaptive equalizer 1 and setting the multipliers to the stored tap weight coefficients.

The output of the adaptive equalizer 1 is applied to the maximum likelihood estimator 2 which includes a branch metric calculator 4, an add-compare-select circuit 5 and a path memory 6. The output of adaptive equalizer 1 is fed into the branch metric calculator 4, where branch metrics B(−1.5), B(−1), B(0), B(+1) and B(+1.5) are calculated corresponding respectively to reference values −1.5, −1, 0, +1 and +1.5 shown in the state transition diagram of FIG. 4 in which equalizer's minimum output spacing corresponding to three transition states, proceeding from S1 to S2, S5, S6 and from S6 to S5, S4, S1, as indicated by broke-line arrows.

As illustrated in FIG. 1, the branch metric calculator 4 has a plurality of subtractors 30 to 34 and squaring circuits 55 to 39 connected to the outputs of corresponding subtractors. Each subtractor and the corresponding squaring circuit form a likelihood estimator for producing a likelihood value B. Subtractors 30 to 34 produce difference signals indicating the differences between the equalizer output and the reference amplitudes −1.5, −1, 0, +1 and +1.5. The difference signals are squared respectively in the corresponding squaring circuits 35 to 39, and branch metrics B(−1.5), B(−1), B(0), B(+1) and B(1.5) are produced.

The outputs of branch metric calculator 4 are fed into the ACS circuit 5. ACS circuit 5 maintains previously obtained path metrics P(S1), P(S2), P(S3), P(S4), P(S5) and P(S6) of the paths respectively entering the states S1, S2, S3, S4, S5 and S6 of the FIG. 4 state transition diagram and updates the previous path metrics with new path metrics using the branch metrics B(−1.5), B(−1), B(0), B(+1) and B(1.5) by solving the following add-compare Equations:

$$P(S1)=\min\ [P(S1)+B(+1.5),\ P(S4)+B(+1)]$$

$$P(S2)=P(S1)+S(+1)$$

$$P(S3)=P(S2)+S(0)$$

$$P(S4)=P(S5)+B(0)$$

$$P(S5)=P(S6)+B(-1)$$

$$P(S6)=\min\ [P(S6)+B(-1.5),\ P(S3)+B(-1)]$$

where, min [x, y] indicates the smallest of x and y. The path metrics updated in this way are maintained as new path metrics until they update next.

Specifically, the ACS circuit 5 determines which one of the sums within the two brackets is greater than the other and produces logic signals $U_1$=0 or 1 and $U_2$=0 or 1 as follows:

If $P(S1)+B(+1.5)<P(S4)+B(+1)$, $U_1$=0; otherwise, $U_1$=1.

If $P(S3)+B(-1)<P(S6)+B(-1.5)$, $U_2$=0; otherwise, $U_2$=1.

The logic signals $U_1$ and $U_2$ are supplied to the path memory 6 as switching control signals.

Figure 4:
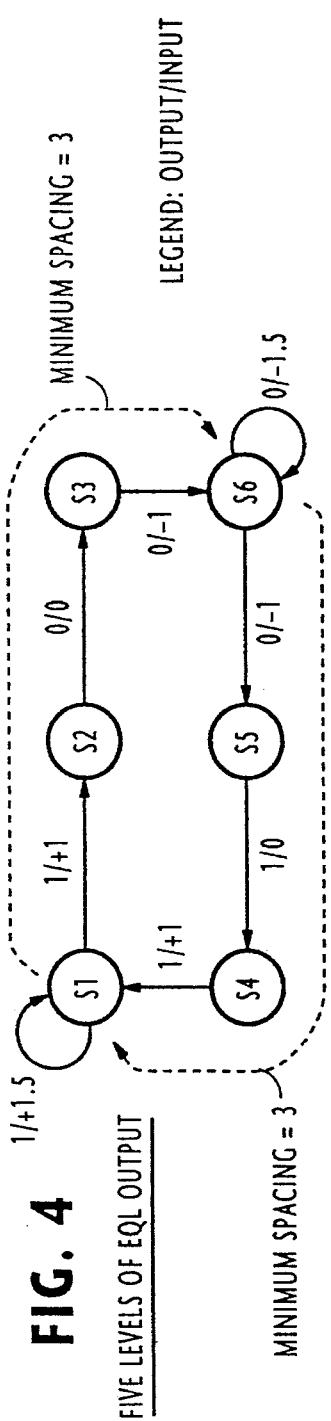
FIG. 4 is a state transition diagram of the maximum likelihood estimator of the present invention.
Figure 5:
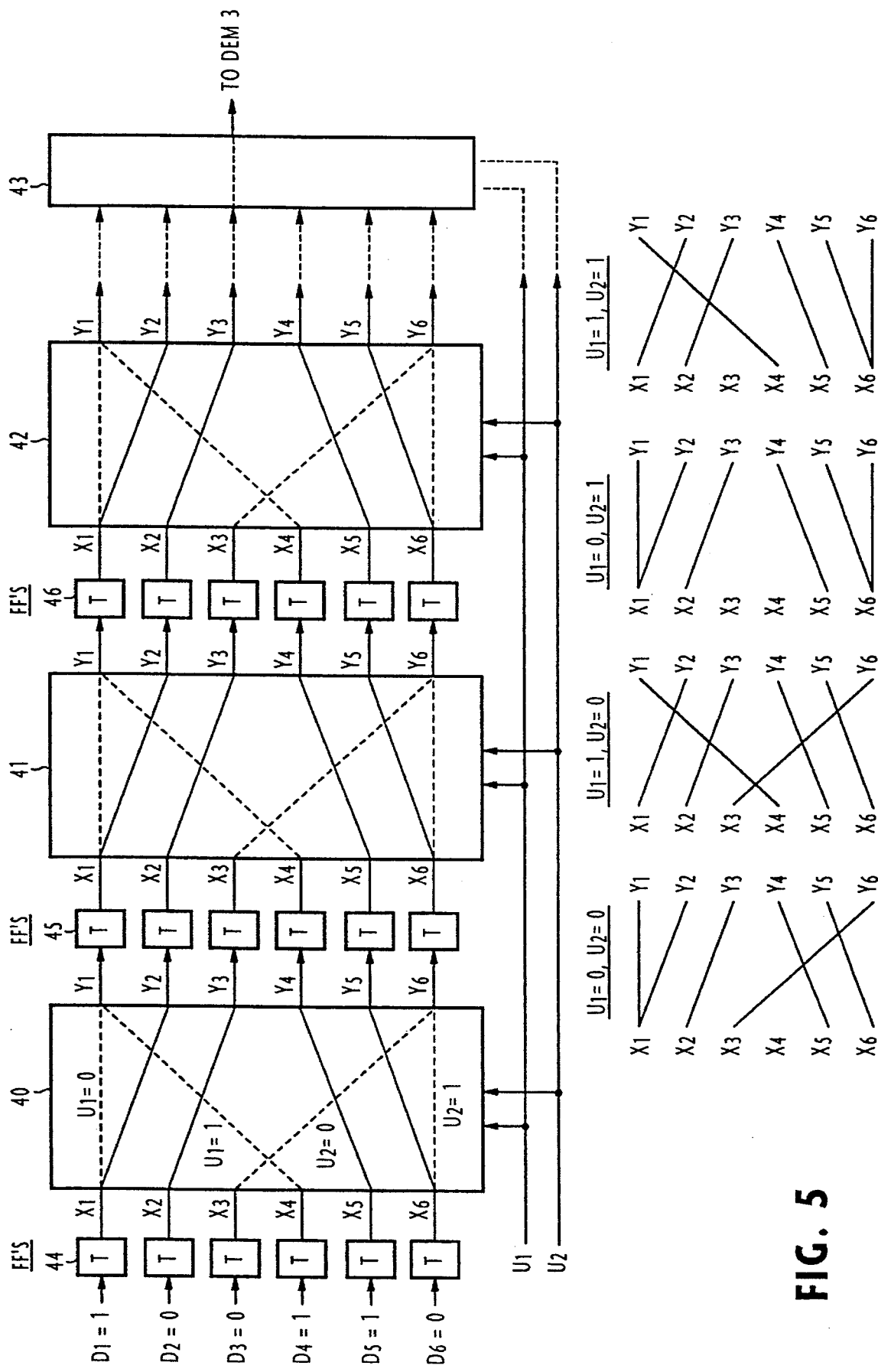
FIG. 5 is a block diagram of the path memory of FIG. 1 together with illustrations showing four possible switched configurations.

As shown in detail in FIG. 5, the path memory 6 is made up of a series of switches 40, 41, 42 and 43 interconnected by banks of flip-flops, each successive flip-flop bank being docked for shifting the outputs of each switching stage to the next. Each switch has inputs $X_1$ through $X_6$ and corresponding outputs $Y_1$ through $Y_6$. These $X_1$ to $X_6$ inputs and $Y_1$ to $Y_6$ outputs correspond to transition states S1 to S6, respectively. The X inputs s and Y outputs are connected according to the state transition diagram of FIG. 4, so that inputs $X_1$, $X_2$, $X_5$ and $X_6$ are permanently connected to outputs $Y_2$, $Y_3$, $Y_4$ and $Y_5$ as indicated by solid lines in FIG. 4. Whereas, as indicated by broken lines, input $X_1$ or $X_4$ is connected to output $Y_1$ in response to $U_1$=0 or $U_1$=1, respectively, and input $X_3$ or $X_6$ is connected to output $Y_6$ in response to $U_2$=0 or $U_2$=1, respectively. Thus, four possible switching configurations can exist as illustrated in FIG. 4, and each switching stage is reconfigured according to the control signals $U_1$ and $U_2$, which are, in turn, determined in accordance with the transition role of the maximum likelihood estimator.

The internal states of each flip-flop bank are updated by the outputs of the preceding switching stage. First-stage flip-flops 44 are initialized with data bits $D_1=1$ $D_2=0$, $D_3=0$, $D_4=1$, $D_5=1$, $D_6=0$ which correspond respectively to states S1 to S6. The logic level of each of these initial data bits $D_1$ to $D_6$ corresponds to the output value of the corresponding transition state of FIG. 4 as indicated on the left side of each slash marked alongside the corresponding branch. The data bits stored in flip-flops 44 are shifted to the next flip-flops 45 through switch 40 and then to flip-flops 46 by way of switch 41. The process is continued so that data bits are transposed in positions according to the transition rule as they propagate along the way until same bit streams appear in the final stage 45. One of the outputs of the final switching stage is taken as a representative and supplied to the (1+D) demodulator 3.

The (1+D) demodulator 3 includes a delay element 7 and a modulo-2 adder, or exclusive-OR gate 8. The output of the maximum likelihood estimator 2 is applied to the gate 8 through two path; a delayed path provided through delay element 7 to exclusive-OR gate 8 and a direct path to this gate. The exclusive-OR gate 8 combines successive data bits from the estimator and produces a replica of the original data bit stream.

Depending on the modulation technique such as RLL (run length limited) modulation employed in the recording of signals, the equalizer's output spacing may vary with the minimum spacing between successive symbol reversals and pit edges.

Figure 6A:
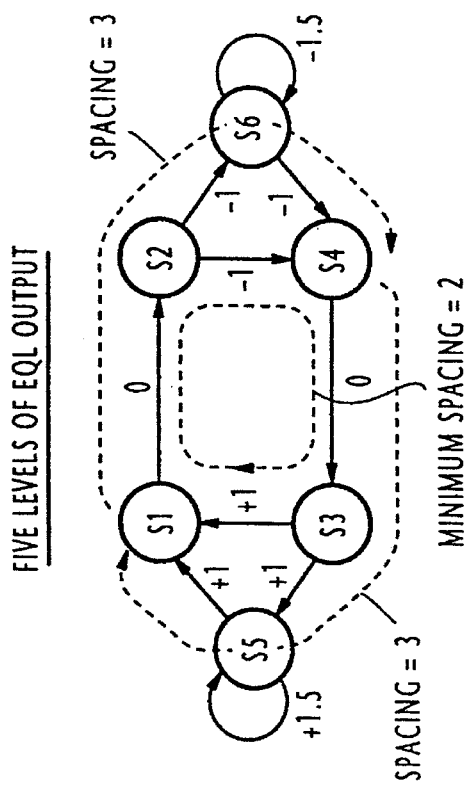
FIGS. 6A and 6B are other state transition diagrams of the maximum likelihood estimator of the present invention.
Figure 6B:
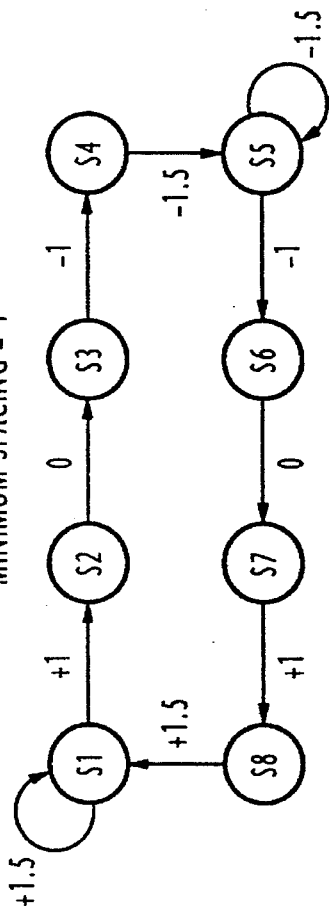

FIG. 6A shows another possible state transition diagram of the maximum likelihood estimator 2 for the five equalizer output levels in the case of equalizer's minimum output spacing "2" where transitions proceed from state S1 to S2, S4, S3 and in the case or spacing "3" where transitions proceed from state S1 to S2, S6, S4 and from state S4 to S3, S5, S1. If the equalizer's minimum output spacing is "4", the state transition diagram of the estimator has eight transition states as shown in FIG. 6B.

Figure 7:
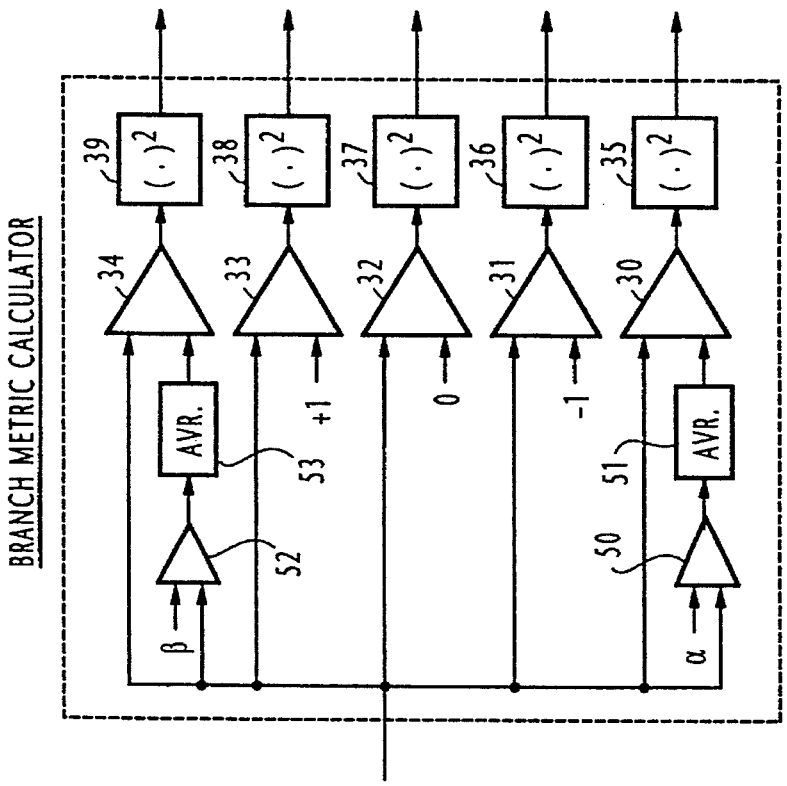
FIG. 7 is a block diagram of a modified branch metric calculator.

A modified form of the branch metric calculator is illustrated in FIG. 7, which is suitable for applications where there is a substantial mount of channel variations. As shown in FIG. 7, the modified branch metric calculator includes a first decision threshold calculator 50 and a second decision threshold calculator 52 for detecting decision thresholds which appear at other than the predefined values due to channel fluctuations. Threshold calculator 50 detects those components of the output of equalizer 1 having amplitude lower than a threshold β which lies between −1 and −1.5 and calculates the average value of past amplitudes that appeared over a predefined period. This average value is supplied to the comparator 30 as a lowest decision threshold, instead of the −1.5 decision threshold. In a similar manner, threshold calculator 52 detects those components of the output of equalizer 1 having amplitude higher than a threshold α which lies between +1 and −1.5 and calculates the average value of past amplitudes that appeared over the predefined period. This average value is supplied to the comparator 34 as a highest decision threshold, instead of the +1.5 decision threshold. The decision thresholds of comparators 30 and 34 are thus adaptively varied to permit the maximum likelihood estimator to adapt to the varying conditions of the channel.

Figure 8:
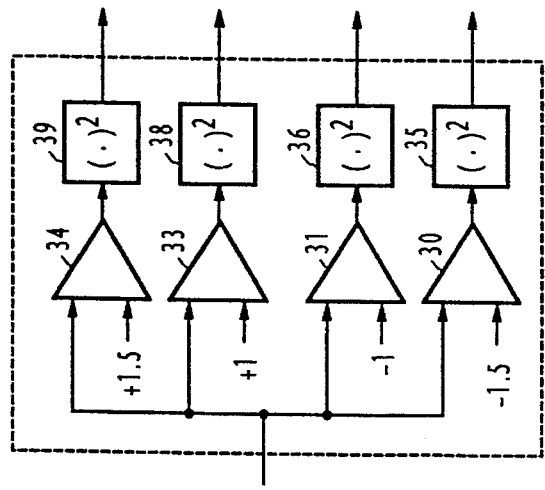
FIG. 8 is a block diagram of a further modification of the branch metric calculator for four-level equalizer outputs.

If the reference amplitudes used in the adaptive equalizer 2 are two, i.e., −1 and +1, instead of the three reference amplitudes −1, 0 and +1, two inherent amplitude peaks corresponding to the reference amplitudes −1 and +1 and two spontaneous amplitude peaks corresponding to −1.5 and +1.5 will be produced. In this case, the branch metric calculator is modified is shown in FIG. 8, which differs from the previous embodiment in that it includes four sets of comparators and squaring circuits corresponding to four reference amplitudes −1.5, −1, +1 and +1.5, respectively.

Figure 9B:
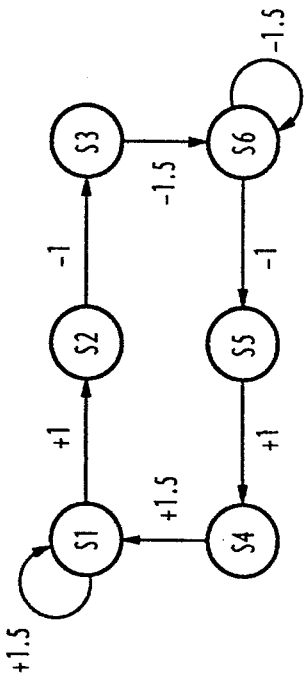
FIGS. 9A, 9B and 9C are state transition diagrams the maximum likelihood estimator associated with the branch metric calculator of FIG. 8.
Figure 9C:
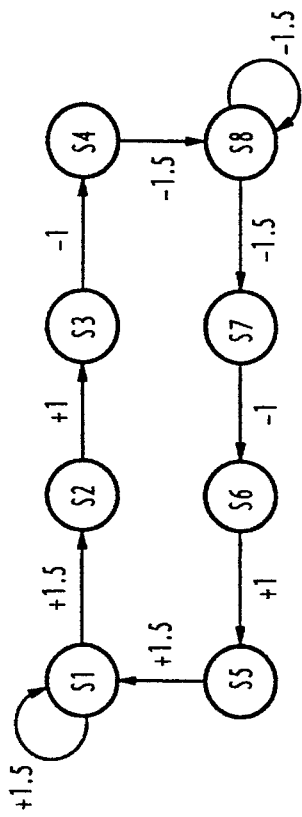
Figure 9A:
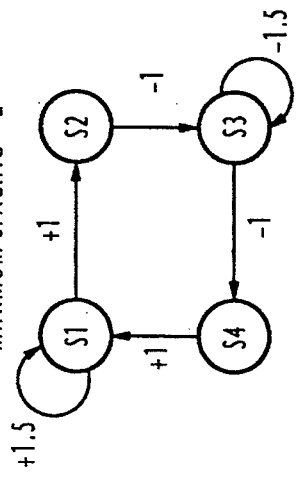

For 4-level equalizer outputs, the maximum likelihood estimator will have state transition diagrams as shown in FIGS. 9A, 9B and 9C for equalizer's minimum output spacings of "2", "3" and "4", respectively.

Figure 10:
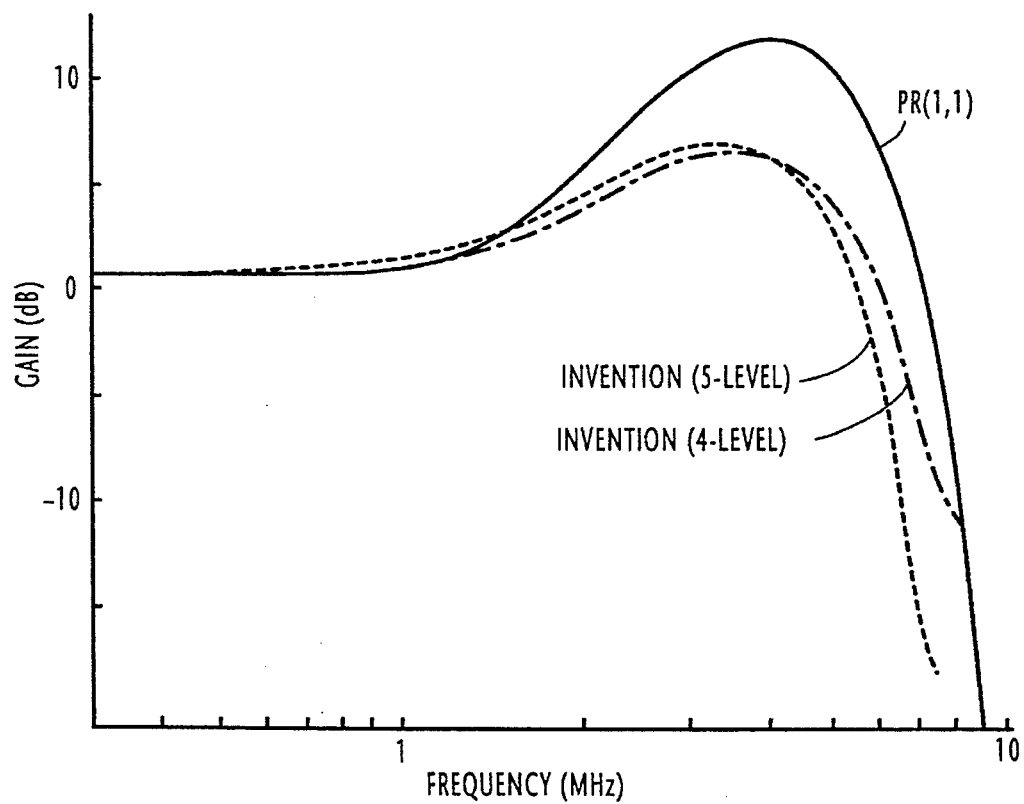
FIG. 10 is a graphic representation of the gain versus frequency characteristics of the present invention in comparison with a prior an equalizer.

For a given recording density, the gain-versus-frequency characteristics of the of four- and five-level equalizers of the present invention are favorably compared with the corresponding characteristic of a prior art PR(1,1) equalizer as illustrated in FIG. 10. It is appreciated that the undesired emphasis at high frequencies is advantageously reduced in the present invention. This permits reproduction of recorded signals with an improved signal-to-noise ratio and extraction of high-density signal energies concentrated in the lower frequency region of the spectrum.

Figure 11:
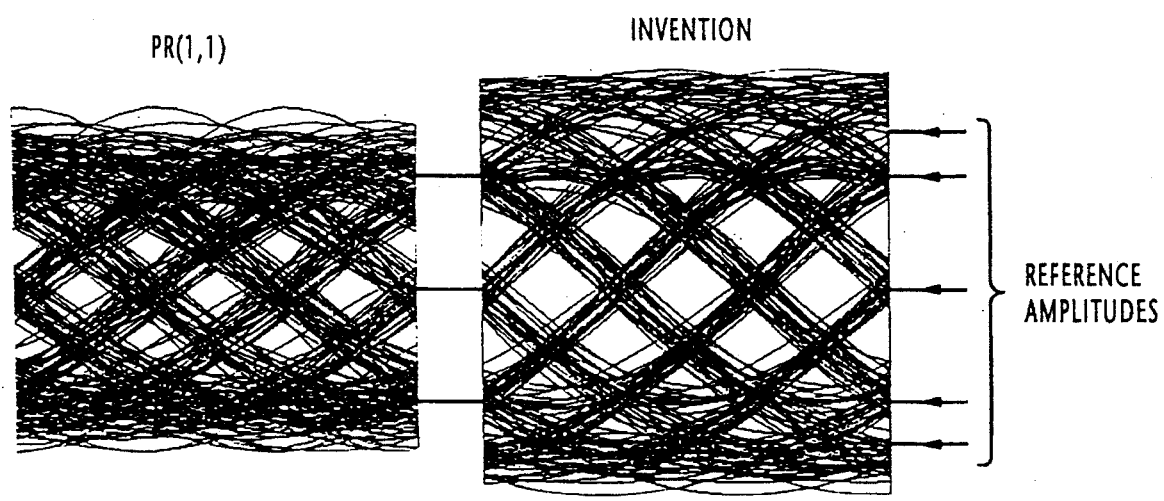
FIG. 11 shows eye patterns of the present invention and the prior art.

The eye pattern of the five-level equalizer of this invention is illustrated in FIG. 11 for comparison with the eye pattern of the PR(1,1) equalizer. Because of the wider aperture of the present invention than is provided by the prior art, the error rate of the signal processor of this invention is significantly improved.

What is claimed is:

1. A signal processor for processing a multilevel signal, comprising:

a partial response equalizer having a first predetermined number of reference amplitudes, the equalizer receiving said multilevel signal and detecting therefrom a significant instant of amplitude transition with respect to said reference amplitudes and producing a signal representative of the amplitude at the detected significant instant, said amplitude representative signal assuming one of a second predetermined number of amplitudes including spontaneously generated amplitudes, the second predetermined number being greater than the first predetermined number of said reference amplitudes; and a maximum likelihood estimator having transition states and a state transition rule which determines one of said states with respect to decision thresholds greater in number than said first predetermined number and equal to or smaller than said second predetermined number, the estimator receiving said amplitude representative signal from the equalizer and estimating therefrom a maximum likelihood amplitude according to said state transition rule.

2. A signal processor as claimed in claim 1, wherein said partial response equalizer comprises:

a tapped-delay line filter having a series of delay-line taps, a plurality of tap-weight multipliers connected to said taps, respectively, and an adder, said filter receiving said multilevel signal through said delay-line taps to produce tap signals, weighting the tap signals by tap weight coefficients in said multipliers, and summing the weighted tap signals in said adder to produce a filtered signal;

a decision circuit for determining to which one of said reference amplitudes said filtered signal is closest and producing therefrom a decision output;

a reference voltage generator responsive to said decision output for producing one of a plurality of reference voltages corresponding to said reference amplitudes respectively;

an error detector for detecting a decision error between a reference voltage produced by said reference voltage generator and said filtered output;

detector means responsive to said decision output for producing a dining signal corresponding to said significant instant; and gate means for passing a portion of said decision error in response to said timing signal; and a plurality of correlator means for detecting correlations between said tap signals and the decision error passing through said gate means and supplying the detected correlations to said tapped-delay line filter as said tap-weight coefficients.

3. A signal processor as claimed in claim 1, wherein said partial response equalizer is a non-adaptive equalizer having stored tap-weight coefficients.

4. A signal processor as claimed in claim 1, wherein said maximum likelihood estimator includes a branch metric calculator, an add-compare-select (ACS) circuit and a path memory connected to the ACS circuit, said branch metric calculator comprising:

a plurality of comparators for comparing said amplitude representative signal with said third predetermined number of decision thresholds and detecting a plurality of differences between said amplitude representative signal and said decision thresholds; and a plurality of squaring circuits for squaring the differences detected by the comparators and applying the squared differences to said ACS circuit.

5. A signal processor as claimed in claim 4, further comprising:

a first decision calculator for detecting the amplitude representative signal having an amplitude smaller than and close to highest of said decision thresholds during a predefined interval and determining an average value of amplitudes of the detected signals, and applying the average value to a corresponding one of said plurality of said comparators as a first variable decision threshold; and a second decision calculator for detecting the amplitude representative signal having an amplitude higher than and close to smallest of said decision thresholds during said predefined interval and determining an average value of amplitudes of the detected signals, and applying the average value to a corresponding one of comparators as a second variable decision threshold.

6. A signal processor as claimed in claim 1, wherein said multilevel signal is a signal reproduced from an optical recording disc.

7. A signal processor as claimed in claim 1, wherein said multilevel signal is a signal reproduced from a vertical-axis magnetic recording medium.

8. A method for processing a multilevel signal, comprising the steps of:

receiving said multilevel signal, and detecting therefrom a significant instant of amplitude transition with respect to a first predetermined number of reference amplitudes;

producing a signal representative of the amplitude at the detected significant instant, said amplitude representative signal assuming one of a second predetermined number of amplitudes including spontaneously generated amplitudes, said second predetermined number being greater than the first predetermined number of said reference amplitudes;

receiving said amplitude representative signal; and performing a maximum likelihood estimation on the received amplitude representative signal according to a state transition rule which determines a transition of the maximum likelihood estimation from each one of distinct states to another with respect to decision thresholds greater in number than said first predetermined number and equal to or smaller than said second predetermined number.

* * * * *

UNITED STATES PATENT AND TRADEMARK OFFICE
CERTIFICATE OF CORRECTION

PATENT NO.    : 5,604,724
DATED         : February 18, 1997
INVENTOR(S)   : Masato SHIOKAWA It is certified that error(s) appears in the above-identified patent and that said Letters Patent is hereby corrected as shown below:

| | | |
|---|---|---|
| Column 1, | line 13, | delete "pin" and insert --pits--. |
| Column 2, | line 16, | delete "derail" and insert --detail--. |
| Column 4, | line 8,  | delete "S5" and insert --S3--; |
|           | line 31, | delete "S(+1) and insert --B(+1)--; |
|           | line 34, | delete "S(0)" and insert --B(0)--; |
|           | line 56, | delete "docked" and insert --clocked--; |
|           | line 60, | delete " s ". |
| Column 5, | line 19, | delete "45" and insert --3--; |
|           | line 24, | delete "path" and insert --paths--. |
| Column 7, | line 7,  | delete "dining" and insert --timing--. |

Signed and Sealed this

Ninth Day of September, 1997

Attest:

BRUCE LEHMAN

*Attesting Officer*    *Commissioner of Patents and Trademarks*